(12) United States Patent
Olsson et al.

(10) Patent No.: US 9,817,456 B2
(45) Date of Patent: Nov. 14, 2017

(54) METHOD AND MODULE FOR PROVIDING INSTRUCTIONS FOR SETTING A SUPPLY VOLTAGE

(75) Inventors: Björn Olsson, Göteborg (SE); Anders Aronsson, Uddevalla (SE); Per Ingelhag, Alingsås (SE); Fredrik Larsson, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 14/419,651

(22) PCT Filed: Aug. 9, 2012

(86) PCT No.: PCT/EP2012/065615
§ 371 (c)(1),
(2), (4) Date: Feb. 4, 2015

(87) PCT Pub. No.: WO2014/023354
PCT Pub. Date: Feb. 13, 2014

(65) Prior Publication Data
US 2015/0177804 A1    Jun. 25, 2015

(51) Int. Cl.
*G06F 1/00*    (2006.01)
*G06F 1/26*    (2006.01)
(Continued)

(52) U.S. Cl.
CPC ............. *G06F 1/26* (2013.01); *G06F 1/3206* (2013.01); *G06F 1/206* (2013.01); *Y02B 60/1275* (2013.01)

(58) Field of Classification Search
CPC .......... G06F 1/26; G06F 1/3206; G06F 1/206; G06F 1/32; Y02B 60/1275
(Continued)

(56) References Cited

U.S. PATENT DOCUMENTS 7,366,929 B1    4/2008  Mimberg
7,921,312 B1 *  4/2011  Pennanen ............. G06F 1/3296
                                                        327/524
(Continued)

FOREIGN PATENT DOCUMENTS

TW    200538909 A    12/2005

OTHER PUBLICATIONS

PCT International Search Report for PCT/EP2012/065615, dated Apr. 22, 2013, 3 pages.

(Continued)

*Primary Examiner* — Nitin Patel
(74) *Attorney, Agent, or Firm* — NDWE LLP

(57) ABSTRACT

A first aspect provides in a supply voltage control module, a method of providing instructions for setting a supply voltage comprising obtaining information on a supply voltage need of a load and based on that information, determining a supply voltage that is to be provided to the load. Subsequently, an instruction is sent to a power supply module to supply the determined supply voltage to the load. A need for a supply voltage of a load, like an integrated circuit, may not only depend on design of the load, but also on parameters of the manufacturing process and the level of activity of the load. By obtaining information on a supply voltage need of the load and using that information to determine a supply voltage to be provided to the load, a feedback loop is created by instructing a point of load power supply to provide the supply voltage determined.

16 Claims, 3 Drawing Sheets

(51) Int. Cl.
*G06F 1/32* (2006.01)
*G06F 1/20* (2006.01)

(58) Field of Classification Search
USPC ........................................................ 713/300
See application file for complete search history.

(56) References Cited

U.S. PATENT DOCUMENTS

| | | | |
|---|---|---|---|
| 2003/0206050 A1 | 11/2003 | Huard et al. | |
| 2007/0052453 A1* | 3/2007 | Wald | G06F 1/206 327/100 |
| 2008/0052551 A1 | 2/2008 | Chapuis et al. | |
| 2008/0104423 A1 | 5/2008 | Boecker et al. | |
| 2009/0249092 A1* | 10/2009 | Lam | G06F 1/26 713/310 |
| 2010/0185880 A1* | 7/2010 | Chou | G06F 11/2289 713/300 |
| 2011/0087900 A1* | 4/2011 | Lakhanpal | G06F 1/3203 713/300 |
| 2013/0047023 A1* | 2/2013 | Penzes | H03K 3/0315 713/502 |

OTHER PUBLICATIONS

International Preliminary Report on Patentability for PCT/EP2012/065615, dated Sep. 12, 2014, 14 pages.
First Office Action from foreign counterpart China Patent Application No. 201280075139.1, dated Oct. 17, 2016, 15 pages.
Office Action from foreign counterpart Taiwan Patent Application No. 102121596, dated Feb. 6, 2017, 15 pages.
Second Office Action from foreign counterpart China Patent Application No. 201280075139.1, dated Feb. 22, 2017, 13 pages.
Communication pursuant to Article 94(3) EPC for European Application No. 12750570.9, dated Aug. 8, 2017, 6 pages.

* cited by examiner

METHOD AND MODULE FOR PROVIDING INSTRUCTIONS FOR SETTING A SUPPLY VOLTAGE

CROSS-REFERENCE TO RELATED APPLICATIONS

This application is a National stage of International Application No. PCT/EP2012/065615, filed Aug. 9, 2012, which is hereby incorporated by reference.

TECHNICAL FIELD

The invention relates to power and voltage regulation of power supply to a load.

BACKGROUND

Distributed voltage regulation at a point of load with general power supplied by a power bus is known from the S-100 bus as used in early personal computers like the Altair 8800. Power supplies on the bus were unregulated +8 V and ±18 V, designed to be regulated on the cards to +5 V (used by TTL) and ±12 V (typically used on RS-232 lines or disk drive motors).

SUMMARY

It is preferred to provide feedback control for local voltage regulation.

A first aspect provides in a supply voltage control module, a method of providing instructions for setting a supply voltage. The method comprises obtaining information on a supply voltage need of a load. Based on that information, a supply voltage is determined that is to be provided to the load. Subsequently, an instruction is sent to a power supply module to supply the determined supply voltage to the load.

A need for a certain supply voltage of a load, like an integrated circuit, may not only depend on design of the load. It may also depend on parameters of the manufacturing process and on the level of activity of the load. By obtaining information on a supply voltage need of the load and subsequently using that information to determine a supply voltage that is to be provided to the load, a feedback loop is created by instructing a point of load power supply to provide the supply voltage determined.

In an embodiment of the first aspect, determining a supply voltage to be provided to the load comprises deriving a requested supply voltage from the information on a supply voltage need of a load and sending an instruction to a power supply module to supply the requested supply voltage to the load.

The information received from the load relating to a supply voltage need may not directly be the actual supply voltage. Instead, it may also be a raw signal from a ring oscillator, a frequency of such raw signal or a critical path time value—or difference of such value from a reference value. Such value is preferably converted to an actual supply voltage that is needed or requested by the load—based on the information on a supply voltage need. If for example the frequency of a ring oscillator drops, a higher supply voltage is required. For a specific circuit, for example for multiple frequency intervals of such ring oscillator, a specific requested or required supply voltage may be given. In such case, deriving a requested supply voltage from the information on a supply voltage need of the load means looking up the requested supply voltage by finding the voltage that goes with the frequency detected. In this way, a power supply can be properly instructed to provide the correct power supply.

In a further embodiment, determining a supply voltage to be provided to the load comprises determining whether supplying the requested supply voltage by the power supply module to the load meets pre-determined requirements and sending an instruction to a power supply module to supply the requested supply voltage to the load if supplying the requested supply voltage by the power supply module to the load meets pre-determined requirements.

Mobile and in particular portable devices often have strict requirements on power consumption. This may be even stricter if battery power is low. In such cases, loads like integrated circuits may not be allowed to consume more power than a certain pre-determined level—or otherwise determined power consumption threshold. If compliance with a request of a load for a certain supply voltage would result in the load not exceeding that threshold, the point of load power supply is instructed to provide the requested supply voltage to the load.

Another embodiment of the first aspect comprises if supplying the requested supply voltage by the power supply module to the load does not meet pre-determined requirements, determining a supply voltage to be provided to the load comprises determining a supply voltage which is closest to the requested supply voltage, by which determined supply voltage the pre-determined requirements are met.

This allows an optimal power and in particular voltage to be supplied to the load with requirements met.

In yet a further embodiment of the first aspect, the supply voltage control module is arranged to obtain information on a supply voltage need from multiple loads. The method according to this embodiment further comprises identifying a load to which the information on a supply voltage need is related, identify a power supply module arranged for supplying the determined supply voltage to the identified load and sending an instruction to the identified power supply module to supply the determined supply voltage to the identified load.

An important advantage is that intelligence for controlling various supply voltages is centralized in one place. This results in low cost per point of load power supply and less footprint on the printed circuit board. Furthermore, this set up allows for centralized control taking into account general requirements and conditions of the whole printed circuit board.

A second aspect provides a supply voltage control module for providing instructions for setting a supply voltage, comprising in input module arranged to obtain information on a supply voltage need of a load, a processing unit arranged to determine a supply voltage to be provided to the load based on the information on a supply voltage need of a load; and an output module arranged to send an instruction to a power supply module to supply the determined supply voltage to the load.

A third aspect provides a circuit comprising the supply voltage control module according to the second aspect; at least one processing circuit socket for connecting a processing circuit to the circuit such that the processing circuit is arranged to provide information on a supply voltage need of the processing circuit to the supply voltage control module and at least one power socket for a power supply module arranged to provide power to the processing circuit in accordance with instructions to supply the determined supply voltage to the processing circuit.

BRIEF DESCRIPTION OF THE DRAWINGS

The various aspects and embodiments thereof will now be discussed in further detail in conjunction with Figures. In the Figures.

DETAILED DESCRIPTION

Figure 1:
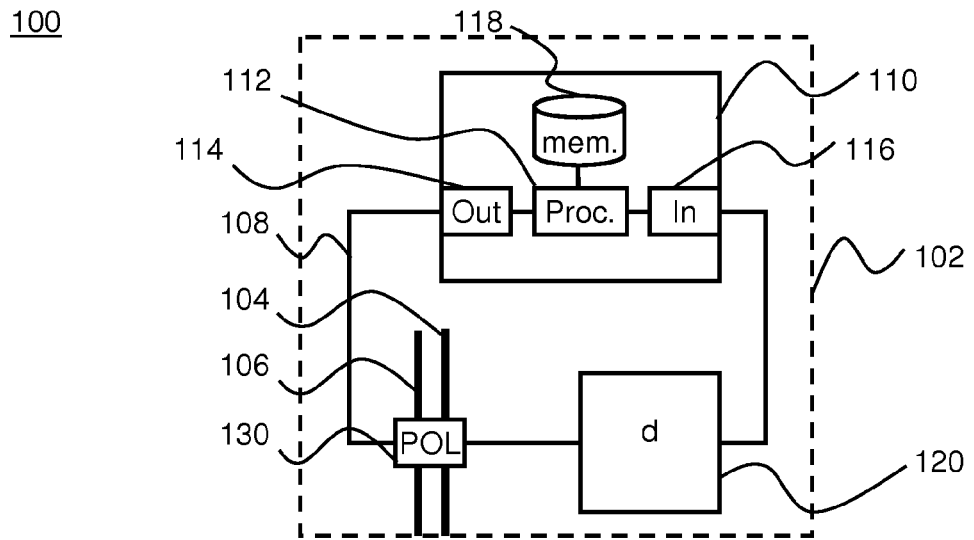
FIG. 1: shows a first circuit as an embodiment of the second aspect.

FIG. 1 shows a circuit 100 comprising a power supply control module 110, a point of load 130 as a power supply and an integrated circuit 120 as a load for the point of load 130. The point of load 130 is connected to the integrated circuit 120 for supplying the integrated circuit 120 with electrical power at a substantially stable voltage level. The level of the voltage that the point of load 130 provides to the integrated circuit 120 is controlled by the power supply control module 110 that is connected to the point of load 130. A first main power conductor 104 and a second main power conductor 106 provide the point of load 130 with a voltage to be regulated by the point of load 130. The power supply control module 110 is also connected to the integrated circuit 120 for obtaining information on a supply voltage need provided by the integrated circuit. As an alternative to two main power conductors, only one power conductor is provided, for example in combination with a ground plane.

The circuit 100 is preferably placed on a single printed circuit board 102, where individual modules may nonetheless also be provided on printed circuit boards, connected to the main printed circuit board. Alternatively, the printed circuit board 102 comprises sockets in which the power supply control module 110, the point of load 130 and the integrated circuit 120 may be fit. In yet another alternative, in particular the point of load 130 and the power supply control module 110 are integrated on the printed circuit board 102. This means that the components of these modules may be directly mounted to the printed circuit board.

The power supply control module 110 comprises an output module 114, a processing unit 112, a flash memory 118 as a memory module and an input module 116. The flash memory 118, the output module 114 and the input module 116 are connected to the processing unit 112. The processing unit 112 is arranged for controlling the various components of the power supply control module 110 and for processing data received by the power supply module 110. The processing unit 112 may be a microcontroller, a microprocessor or another data processing device, either stand-alone or integrated in a larger integrated circuit comprising other modules. The processing unit 112 may be hardwired to perform the appropriate functionality or programmed using computer executable code—software—stored in the flash memory 118. As an alternative to the flash memory, the memory module may also be embodied as F-RAM, M-RAM or another non-volatile memory—or a volatile memory like SRMA or DRAM.

The output module 114 is arranged for communicating with the point of load 130 to instruct the point of load to supply power at a voltage determined by the power supply control module 110 and the processing unit 112 in particular. The output module 114 may be connected to the point of load 130 via a communication bus 108. Alternatively, the output module 114 is connected to the point of load 130 via a direct connection. The instruction may be provided solely as a VID code (voltage identification) or in a larger data message further comprising address data identifying the point of load 130. The latter is particularly advantageous in a scenario with a bus. Alternatively or additionally to the VID code, a reference voltage may be provided to the point of load 130, which reference voltage is to be reproduced.

The input unit 116 of the power supply control module 110 is connected to the integrated circuit 120 for receiving information on a need for a certain supply voltage. Such information may be static, but also dynamic, i.e. changing of a certain period of time. Such period may be relatively short, less than a second, or relatively long, more than a minute, or anything in between. Alternatively, the period is dynamic, where action of the power supply control module 110 is triggered by a message of the integrated circuit 120 comprising information that a different supply voltage is required than the voltage currently supplied. Differences in supply voltage need between various integrated circuits with the same design may be a result of fluctuations in process parameters in the process wherein the integrated circuit has been manufactured. Such differences in supply voltage may also be a result of changes in activity in the integrated circuit 120 or other changes in power consumption.

A change in power consumption at a steady supply voltage results in a change in supply current, which in turn results in a change of a voltage drop over integrated circuit supply lines and thus in a change of a supply voltage finally supplied to various IP blocks in the integrated circuit 120. For high performance, a relatively high supply voltage is required due to voltage drops in supply lines as a result of higher currents. In case of low performance, a lower supply voltage is sufficient and desired from an energy saving perspective.

A supply voltage that may be needed by the integrated circuit 120 may for example be determined by determining a critical path timing, so by timing propagation of a data signal through various gates, by determining a frequency of a ring oscillator or by other ways. The time value or frequency value thus obtained may subsequently be compared to a reference value and the reference value may thereafter be further processed to determine a certain voltage that may be required for proper performance of the integrated circuit 120 at that instant. To the power supply control module 110, the information may be communicated in various formats, like the raw data on the frequency, the actual critical path propagation time, differences of those values from a reference value, a required voltage obtained by processing any values, as VID code or a reference voltage, any other values or a combination thereof.

The information on a need for a certain supply voltage may be communicated by the integrated circuit 120 to the power supply control module 110 in various ways. In case of a VID code or any other value available in binary code, the data is well suitable to be communicated to the power supply control module 110 over a data communication bus in a binary format. In such embodiment, data communication of an SMBus or System Management Bus communication protocol is preferred. If the output information on a supply voltage need is provided as an analogue value, like an analogue differential voltage or the output of an ring oscillator, the connection between the integrated circuit and the input module 116 is preferably a direct one. The output of the ring oscillator may be considered as a binary signal from a signal strength point of view, but the actual frequency is analogue data.

Translation of the data is required to provide a proper instruction to the point of load 130, in particular if the data provided by the integrated circuit 120 to the power supply control module 110 is not provided as a VID code or an actual voltage needed by the integrated circuit 120. For this purpose, the input module 116 may be provided with conversion circuitry for converting a signal having a frequency to a value representing the frequency, with an analogue to digital converter, another converter or a combination thereof. Alternatively or additionally, the processing unit 112 may be arranged for translating the data received to an actually demanded or required voltage, in particular if the data received from the integrated circuit is a binary data signal as the processing unit 112 used in a preferred embodiment is not able to process analogue signals.

Figure 2:
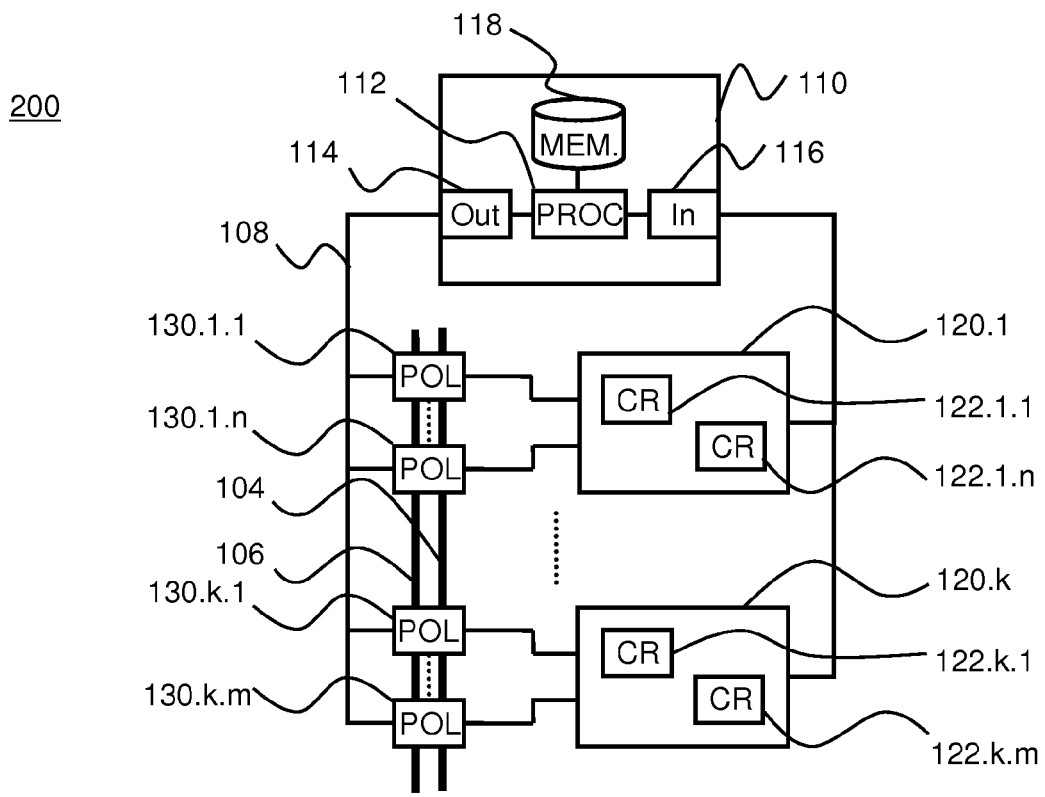
FIG. 2: shows a second circuit as another embodiment of the second aspect.

FIG. 2 shows a circuit 200 comprising the power supply control module 110 and multiple loads and points of load. The various integrated circuits, with an amount identified as k, also comprise multiple cores that each require a separate supply of power, possibly at different voltage levels. A core of an integrated circuit is usually a sub-circuit having a more or less autonomous functionality, like a memory block, a microprocessor or dedicated signal processing circuitry.

The circuit 200 comprises a first integrated circuit 120.1 comprising a first core 122.1.1, a second core 122.1.n and n−2 other cores. The first core 122.1.1 and the second core 122.1.n each require a different power supply. The first core 122.1.1 is provided with power by a first point of load 130.1.1 and the second core 122.1.n is provided with power by a second point of load 130.1.n.

The circuit 200 comprises a second integrated circuit 120.k comprising a third core 122.k.1, a fourth core 122.k.m and m−2 other cores. The third core 122.k.1 and the fourth core 122.k.m each require a different power supply. The third core 122.k.m is provided with power by a third point of load 130.k.1 and the fourth core 122.k.m is provided with power by a fourth point of load 130.k.m. k, m And n may be any positive integer, so the number of integrated circuits and the number of cores per integrated circuit may be unlimited.

Preferably, each core issues a signal comprising information on a supply voltage need for each individual core. Alternatively, only one signal with one data message indicating a global supply voltage need for the whole integrated circuit is provided, which may be translated by the power supply control module 110 in individual voltage needs for each of the individual cores.

Figure 3:
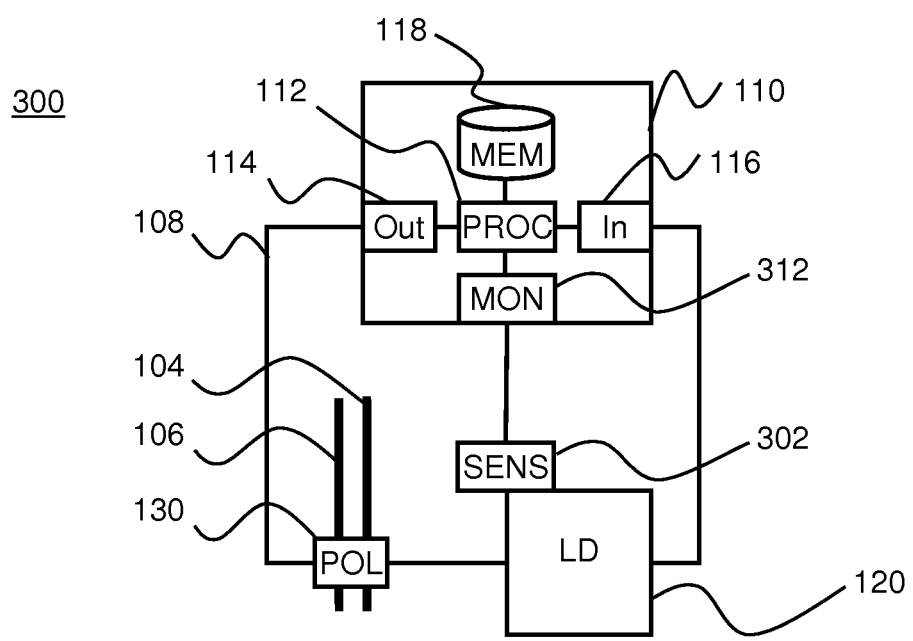
FIG. 3: shows a third circuit as a further embodiment of the second aspect.

FIG. 3 shows a circuit 300 comprising a power supply control module 110, a point of load 130 as a power supply and an integrated circuit 120 as a load for the point of load 130. The point of load 130 is connected to the integrated circuit 120 for supplying the integrated circuit 120 with electrical power at a substantially stable voltage level. The level of the voltage that the point of load 130 provides to the integrated circuit 120 is controlled by the power supply control module 110 that is connected to the point of load 130. The power supply control module 110 is also connected to the integrated circuit 120 for obtaining information on a supply voltage need provided by the integrated circuit. The output module 114 is arranged for communicating with the point of load 130 to instruct the point of load to supply power at a voltage determined by the power supply control module 110 and the processing unit 112 in particular.

The circuit 300 further comprises a temperature sensor 302 as a sensor for sensing a state of the integrated circuit 120 and in this embodiment the temperature in particular. The temperature sensor 302 is connected to the power supply control module 110 and to a sensor monitoring unit 312 in particular. The sensor monitoring unit 312 is connected to the processing unit 112 and arranged for converting data received from the temperature sensor 302 to a format that can be processed by the processing unit 112. The information on a temperature of a load may be relevant for two reasons. First, temperature strongly influences characteristics of semiconductor circuits, for which reason it may also influence a supply voltage required. Second, the information may be used to check whether the integrated circuit 120 does not become too hot. If that were to be the case, the supply voltage may have to be reduced.

Instead of or in addition to the temperature sensor 302, a current sensor, a voltage sensor, another sensor or a combination thereof may be provided and connected to the sensor monitoring unit 312. The sensor may be comprised by the integrated circuit 120 or provided separately.

Figure 4:
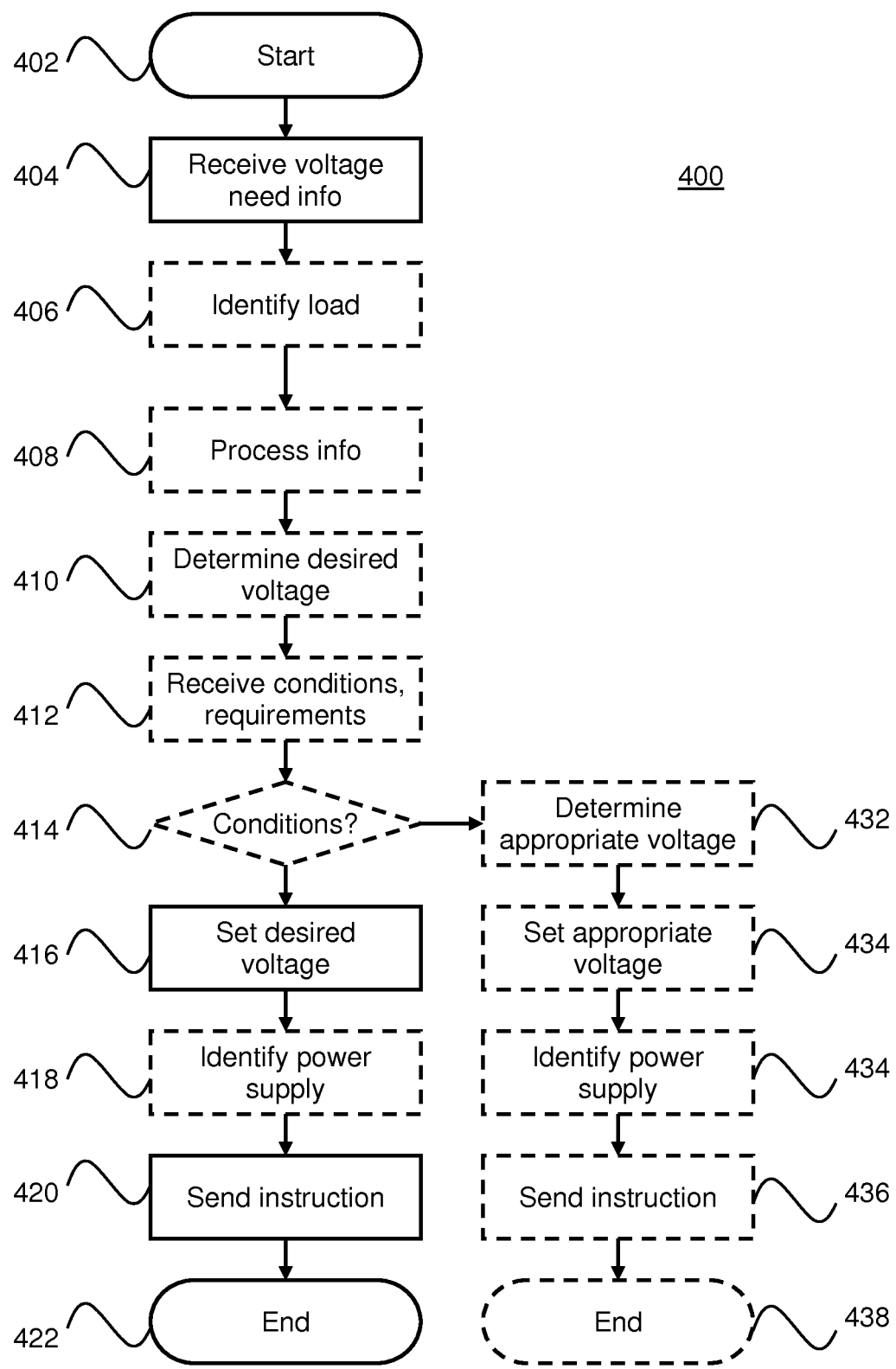
FIG. 4: shows a flowchart depicting a procedure as an embodiment of the first aspect.

In this way, the power supply control module 110 receives information related to a supply voltage need of a core comprised by an integrated circuit or an integrated circuit as a whole. Additionally, further input data like the temperature of the integrated circuit may be used. This information may be used to determine a supply voltage to be provided by the point of load 130 and/or other point of load in the circuit 300 and/or another circuit to the integrated circuit 120 and/or other loads. FIG. 4 shows a flowchart 400 depicting a procedure for determining an actual supply voltage to be provided to a load and providing instructions to point of load for providing the determined voltage.

The procedure starts in a terminator 402 and continues with receiving information on a supply voltage need in step 404, by the power supply control module 110 from the integrated circuit 120. Receiving this information may be in response to the power supply control module 110 sending a query for information to the integrated circuit 120. As discussed above, such information may be a VID code, a raw signal from a ring oscillator or another raw analogue signal, information on how a value of a physical parameter of the integrated circuit 120 differs from a reference value, other or a combination thereof. The information is received by the input module 116.

Subsequently, the load from which the information is received is identified in step 406. Such load may be a full integrated circuit or alternatively a single core of the integrated circuit or a group of cores. If the load is connected to the power supply control module 110 by means of a communication bus, the information may be accompanied with address information that may be used to identify the load to which the information relates. Alternatively, the load may be connected to the power supply control module 110 by means of a direct electrical connection between pins of the integrated circuit and the power supply control module 110. In the latter case, the load may be identified by the pin or pins of the power supply control module 110 at which the information is received.

Having identified the load to which the information on a supply voltage needed received relates, the information received is processed in step 408. In case required, the information received is converted to a format that can be handled by the power supply module 110 and the processing unit 112 in particular. As discussed above, the processing may be an analogue to digital conversion, conversion of a frequency to a desired voltage level, other or a combination thereof. Conversion from a frequency to a desired voltage level may be done by looking up a desired voltage with the frequency as a key in a first table stored in the flash memory 118.

In step 410, the desired voltage or the needed voltage for optimal performance of the load is determined based on information received and processed. The output of step 410 is a desired voltage that may be provided in the format of a VID code or a reference voltage.

In certain scenarios, limits are imposed on the total power supplied to all components on a printed circuit board, the total power supplied to a single integrated circuit, to a minimum or maximum current or voltage supplied, the temperature of an integrated circuit or a core, other, or a combination thereof. Such requirements are retrieved in step 412 from the flash memory 418. Alternatively, the requirements are retrieved from an external memory. Also conditions of the integrated circuit are retrieved, like temperature, current, other, or a combination thereof.

Subsequently, the determined desired voltage—based on the information on a supply voltage need—is checked against the requirements and the conditions in decision 414. In particular the state of the integrated circuit and/or some or all components provided on the printed circuit board is assessed in case the desired voltage is applied to the load. If that state assessed does not comply with the requirements retrieved before, for example because the temperature of the integrated circuit would become too high or is already too high, the current provided to the circuit would become too high or is already too high or the power consumption of the core, the integrated circuit or all components on the printed circuit board would become too high or is already too high, the procedure branches to step 432.

If providing the voltage determined in step 410 yields a state that complies with requirements retrieved in step 412, the process continues to step 416 in which the voltage determined in step 410, so the voltage desired by the load, is set as the supply voltage to be supplied to the load from which the information on a supply voltage need originates.

In step 418, the point of load that is to provide the supply voltage set to the load from which the information on a supply voltage need originates is identified. This may be done by using the earlier obtained identifier of the load to look up an address or other identifier of the point of load power supply that supplies power to the load. Information for obtaining the identifier of the point of load may be provided in a second table stored in the flash memory 118. The second table may be pre-stored during design and/or manufacturing of the printed circuit board. Alternatively, the information is obtained in an initialization procedure where all components available on the printed circuit board report to the supply voltage control module 110.

Having identified the point of load, the voltage control module 110 sends in step 420 an instruction to the identified point of load for instructing the point of load to supply the voltage set in step 416. Subsequently, the procedure ends in terminator 422.

In step 432, an appropriate voltage is determined that is closest to the voltage determined in step 410 to yield a state of the core, integrated circuit, printed circuit board or a combination thereof that meets the requirements retrieved in step 412 or yields a state that gets to these requirements as closely as possible. This means as well that the appropriate voltage may be determined as a voltage currently supplied to the load from which the information on a supply voltage need originates. In such case, the voltage already provided is not adjusted. In step 434, the determined voltage is set as the voltage to be provided by the point of load corresponding to the load from which the information on a supply voltage need originates.

In step 436, the point of load that is to provide the supply voltage set to the load from which the information on a supply voltage need originates is identified. Having identified the point of load, the voltage control module 110 sends in step 438 an instruction to the identified point of load for instructing the point of load to supply the voltage set in step 434. It should be noted that if the voltage already supplied by the point of load is not to be changed, no instruction may be sent out at all. Subsequently, the procedure ends in terminator 440.

As discussed above, the supply voltage need information may be obtained or monitored on a regular basis and subsequently, either on a regular basis, when information changes or a combination of both rules, the procedure depicted by the flowchart 400 may be repeated.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method, in a supply voltage control module, of providing instructions for setting a supply voltage, comprising:
    obtaining, by the supply voltage control module, information on a supply voltage need of a load, the information on the supply voltage need of the load being obtained from the load and includes at least one of: a signal from a ring oscillator, a frequency generated by a ring oscillator, and a critical path timer value, wherein the critical path timer value indicates timing propagation of a data signal through various gates associated with the load;
    based on the information on the supply voltage need of the load, determining, by the supply voltage control module, a supply voltage to be provided to the load, wherein the determining the supply voltage to be provided to the load includes deriving a requested supply voltage from the information on the supply voltage need of the load; and sending an instruction to a power supply module, by the supply voltage control module, to supply the determined supply voltage to the load,
wherein the supply voltage control module is separate from the power supply module and the load.

2. The method according to claim 1, wherein the information on the supply voltage need of the load is obtained from the load and further includes a Voltage Identification code.

3. The method according to claim 1, wherein determining the supply voltage to be provided to the load further includes:
determining whether supplying the requested supply voltage by the power supply module to the load meets pre-determined requirements; and
sending an instruction to the power supply module to supply the requested supply voltage to the load if supplying the requested supply voltage by the power supply module to the load meets the pre-determined requirements.

4. The method according to claim 3, wherein the pre-determined requirements include at least one of the following:
the temperature of the load not to exceed a pre-determined temperature;
the supply voltage not to exceed a pre-determined value;
the supply current not to exceed a pre-determined value; and
the power consumption of the load not to exceed a pre-determined threshold.

5. The method according to claim 3, further comprising not adjusting the supply voltage supplied by the power supply module if supplying the requested supply voltage by the power supply module to the load does not meet the pre-determined requirements.

6. The method according to claim 3, further comprising, if supplying the requested supply voltage by the power supply module to the load does not meet the pre-determined requirements, determining an appropriate supply voltage to be provided to the load, wherein the appropriate supply voltage is closest to the requested supply voltage, and supplying the appropriate supply voltage to the load meets the pre-determined requirements.

7. The method according to claim 1, wherein the supply voltage control module is arranged to obtain information on a supply voltage need from multiple loads, the method further comprising:
identifying a load to which the information on the supply voltage need is related;
identifying a power supply module arranged to supply the determined supply voltage to the identified load; and
sending an instruction to the identified power supply module to supply the determined supply voltage to the identified load.

8. The method according to claim 7, wherein
the information on the supply voltage need comprises address information for identifying the load; and
identifying the power supply module arranged to supply the determined supply voltage to the identified load comprises looking up address information identifying the power supply module arranged to supply the determined supply voltage to the identified load.

9. The method according to claim 1 further comprising repeating the method a pre-determined period after sending the instruction to the power supply module.

10. The method of claim 1, wherein deriving the requested supply voltage from the information on the supply voltage need of the load includes:
translating the information on the supply voltage need into a Voltage Identification code,
wherein the instruction includes the Voltage Identification code translated from the information on the supply voltage need.

11. A supply voltage control module for providing instructions for setting a supply voltage, comprising:
an input module arranged to obtain information on a supply voltage need of a load, the information on the supply voltage need of the load being obtained from the load and includes at least one of: a signal from a ring oscillator, a frequency generated by a ring oscillator, and a critical path timer value, wherein the critical path timer value indicates timing propagation of a data signal through various gates associated with the load;
a processing unit coupled with the input module and arranged to determine a supply voltage to be provided to the load based on the information on the supply voltage need of the load, the processing unit being arranged to determine a supply voltage to be provided to the load by deriving a requested supply voltage from the information on the supply voltage need of the load; and
an output module coupled with the processing unit and arranged to send an instruction to a power supply module to supply the determined supply voltage to the load,
wherein the supply voltage control module is separate from the power supply module and the load.

12. The supply voltage control module according to claim 11, wherein
the input module is arranged to obtain information on a supply voltage need from multiple loads;
the processing unit is arranged to
identify a load to which the information on the supply voltage need is related; and
identify a power supply module arranged to supply the determined supply voltage to the identified load; and
the output module is arranged to send an instruction to the identified power supply module to supply the determined supply voltage to the identified load.

13. A circuit comprising:
a supply voltage control module, comprising:
an input module arranged to obtain information on a supply voltage need of a load, the information on the supply voltage need of the load being obtained from the load and includes at least one of: a signal from a ring oscillator, a frequency generated by a ring oscillator, and a critical path timer value, wherein the critical path timer value indicates timing propagation of a data signal through various gates associated with the load;
a processing unit coupled with the input module and arranged to determine a supply voltage to be provided to the load based on the information on the supply voltage need of the load, the processing unit being arranged to determine the supply voltage to be provided to the load by deriving a requested supply voltage from the information on the supply voltage need of the load; and
an output module coupled with the processing unit and arranged to send an instruction to a power supply module to supply the determined supply voltage to the load;

at least one processing circuit socket to connect a processing circuit to the circuit such that the processing circuit is arranged to provide the information on the supply voltage need of the processing circuit to the supply voltage control module; and at least one power socket for a power supply module arranged to provide power to the processing circuit in accordance with instructions to supply the determined supply voltage to the processing circuit, wherein the circuit is separate from the power supply module and the load.

14. The circuit according to claim 13, wherein the input module of the supply voltage control module is arranged to obtain information on a supply voltage need from multiple loads;

the processing unit of the supply voltage control module is arranged to:
    identify a load to which the information on the supply voltage need is related; and
    identify a power supply module arranged to supply the determined supply voltage to the identified load; and the output module of the supply voltage control module is arranged to send an instruction to the identified power supply module to supply the determined supply voltage to the identified load.

15. The circuit according to claim 14, further comprising:

multiple processing circuit sockets to connect multiple processing circuits to the circuit; and multiple power sockets to connect multiple power supply modules;

wherein the power sockets are connected to the supply voltage control module by means of a serial bus.

16. The circuit according to claim 14, further comprising multiple power sockets to connect multiple power supply modules, wherein the at least one processing circuit socket is connected to the multiple power sockets to receive power from multiple power supplies.

* * * * *

UNITED STATES PATENT AND TRADEMARK OFFICE
CERTIFICATE OF CORRECTION

PATENT NO. : 9,817,456 B2   Page 1 of 1
APPLICATION NO. : 14/419651
DATED : November 14, 2017
INVENTOR(S) : Olsson et al.

It is certified that error appears in the above-identified patent and that said Letters Patent is hereby corrected as shown below:

On the Title Page

In the Figure, delete "  " and insert --  --, therefor.

In the Drawings

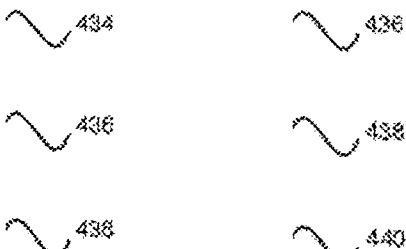

In Fig 4, Sheet 3 of 3, delete "  " and insert --  --, therefor.

In the Specification

In Column 3, Line 63, delete "SRMA" and insert -- SRAM --, therefor.

In Column 5, Lines 37-38, delete "third core 122.k.m" and insert -- third core 122.k.1 --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*